United States Patent [19]

Asakawa et al.

[11] Patent Number: 5,764,061
[45] Date of Patent: Jun. 9, 1998

[54] MARITIME APPARATUS FOR LOCATING A BURIED SUBMARINE CABLE

[75] Inventors: Kenichi Asakawa; Satoru Takagi, both of Tokyo, Japan

[73] Assignee: Kokusai Denshin Denwa Kabushiki Kaisha, Tokyo, Japan

[21] Appl. No.: 738,698

[22] Filed: Oct. 28, 1996

[30] Foreign Application Priority Data

Oct. 26, 1995 [JP] Japan .................... 7-300515

[51] Int. Cl.$^6$ ................ G01V 3/08; G01V 3/165; G01V 3/38; G01R 33/02
[52] U.S. Cl. .............. 324/326; 324/247; 324/345; 324/365
[58] Field of Search .............. 324/127, 67, 244–247, 324/253–255, 260, 326, 345, 365, 529

[56] References Cited

U.S. PATENT DOCUMENTS

| | | | |
|---|---|---|---|
| 3,526,831 | 9/1970 | Smith | 324/529 X |
| 4,427,943 | 1/1984 | Cloutier et al. | 324/345 X |
| 4,438,401 | 3/1984 | Iwamoto et al. | 324/247 X |
| 4,678,371 | 7/1987 | Yamamura et al. | 324/127 X |
| 5,151,649 | 9/1992 | Héroux | 324/127 |
| 5,321,361 | 6/1994 | Goodman | 324/326 |

FOREIGN PATENT DOCUMENTS

| | | | |
|---|---|---|---|
| 110069 | 9/1981 | Japan | 324/326 |

OTHER PUBLICATIONS

Francis, Samuel H.; Magnetic Localization of AC/Driven Buried Cable By The SCARAB Submersible, Oceans'76 MTS–IEEE Paper, Conference Washington, D.C. Sep. 13–15, 1976, pp. 24B–1–24B–7.

Primary Examiner—Gerard R. Strecker
Attorney, Agent, or Firm—Pollock, Vande Sande & Priddy

[57] ABSTRACT

A remotely operated submersible robot 10 is provided with two differential triaxial orthogonal dc magnetic sensing units, 1 and 2, each comprising two triaxial orthogonal dc magnetic sensors spaced at a predetermined distance apart and with their corresponding axes set in parallel; each triaxial orthogonal dc magnetic sensor incorporating three dc magnetic sensing elements sensitive only to a magnetic field in a specific axial direction and disposed such that the axial directions of respective dc magnetic sensing elements cross each other at right angles. Analog signals sent out from the differential triaxial orthogonal dc magnetic sensing units 1 and 2 are converted into digital signals by an analog-to-digital converter, and transmitted to a mother ship 20 via a tether cable 6. The output signals thus transmitted from the aforesaid sensing units are processed by a processing unit installed in the mother ship 20 to compute the distance to a submarine cable, a difference in elevation between the submarine cable and the submersible robot, and the direction of the submarine cable laid down, which are shown on a display.

5 Claims, 8 Drawing Sheets

MARITIME APPARATUS FOR LOCATING A BURIED SUBMARINE CABLE

BACKGROUND OF THE INVENTION

1. Field of the Invention

This invention relates to an apparatus for locating the whereabouts of a buried submarine cable.

2. Description of the Prior Art

The results of investigation of the causes for damages done to submarine cables to date show that most of the damages were caused by fishing nets or anchors hooking submarine cables. Accordingly, submarine cables laid down in shallow water are buried under the sea bed to protect them from being damaged. Still, accidents can happen with these buried submarine cables.

Common practice of repairing a damaged buried submarine cable is to cut it into two separate sections underwater, pull up the cut ends thereof onto a repair ship, and connect the cut ends with each other via an offering cable for repair placed in-between. The submarine cable thus repaired is laid down and buried under the sea bed. A remotely operated submersible robot is used for doing various jobs such as probing for a damaged spot, surveying the surrounding condition, reburial of repaired submarine cables and so on.

In the conventional method of locating a buried submarine cable, the buried submarine cable is impressed with alternating current of around 20 Hz beforehand to produce an ac magnetic field, which is then detected by ac magnetic sensors, enabling an operator to find out the location of the buried submarine cable. This method has excellent features such as high sensitivity, capability of measuring the relative position, direction ,and burial depth of submarine cables and so on.

However, this method has problems when applied to buried submarine cables extended over a long distance; one problem being difficulty in detecting a cable at a far-away spot due to the strength of ac attenuating as it propagates, and another problem being the impracticability of impressing some outdated coaxial cables still in the field with ac even when prior survey of the laid condition of a submarine cable in the field is required to prevent damages.

A submarine cable locating system using non-directional dc magnetic sensors has also been well known. In this system, a submarine cable is detected by sensing dc supplied to the submarine cable and a dc magnetic field created by armoring steel wires of the submarine cable; the submarine cable is impressed with dc to supply electric power to relays interposed at some points along the whole length of the submarine cable.

However, with this method, it is impossible to detect the exact position and direction of a submarine cable laid down and a difference in elevation between the submarine cable and a level of measurement. Hence, it used to be a very difficult job for a submersible robot to track a submarine cable using the dc magnetic sensors.

Besides the above, there has been another well known method of detecting submarine cables using a uniaxial differential type dc magnetic sensing unit comprising two dc magnetic sensors having sensitivity only to one axial direction, respectively, and disposed such that their sensitivity axes are set in parallel and spaced at an adequate distance apart so that a difference in the magnitude of the axial component of a magnetic field strength between two spots is obtained from a difference in the output between the two dc magnetic sensors. By obtaining such a difference as stated above, it becomes possible to extract only a magnetic field produced by a submarine cable, getting rid of the effect of the uniform terrestrial magnetic field.

However, with this method, it was possible to detect only the approximate position of a submarine cable, but impossible to obtain the exact distance to, elevation of, and direction of a submarine cable laid down, making it very difficult for a submersible robot to track the submarine cable by use of this type of sensor.

Therefore, it is an object of the present invention to provide a submarine locating system for practical application that is capable of obtaining the exact distance to, elevation of, and direction of a submarine cable, solving problems with the conventional systems for detecting submarine cables described as above.

SUMMARY OF THE INVENTION

In a submarine cable locating system of the invention to achieve the aforesaid object by sensing a direct current flowing through a submarine cable and a dc magnetic field created by armoring steel wires of the submarine cable, a submersible robot is provided with a or a plurality of differential triaxial orthogonal dc magnetic sensing units each comprising two triaxial orthogonal dc magnetic sensors spaced at an adequate distance apart and with their corresponding axes set in parallel; each of the triaxial orthogonal dc magnetic sensors incorporating therein three dc magnetic sensing elements each sensitive only to a dc magnetic field in a specific axial direction and disposed such that the axes of respective dc magnetic sensing elements cross each other at right angles so that the output of a or the plurality of differential triaxial orthogonal dc magnetic sensing units are converted into digital signals through an analog-to-digital (A/D) converter, and processed by a processing unit. The results thus obtained are shown on a display installed in a ship enabling an operator to detect the whereabouts of a submarine cable.

The processing unit is capable of computing the distance to the submarine cable, a difference in elevation between the submersible robot and the submarine cable, and the direction in which the submarine cable is laid down by performing computation on the basis of a difference in output between the two dc magnetic sensors with their corresponding axes set in parallel and incorporated in each of the differential triaxial orthogonal dc magnetic sensing units.

Also the processing unit is capable of determining the position of the submarine cable by compensating for fluctuation in the sensitivity and offset of the dc magnetic sensing elements and angular deviations of respective axes thereof and computing on the basis of the results obtained after such compensating operation.

Furthermore, in order to eliminate the effect of variation in the output of the differential triaxial orthogonal dc magnetic sensing units accompanying the rotation of the submersible robot in which the differential triaxial orthogonal dc magnetic sensing units are mounted, the submersible robot is rotated once at an underwater spot in a uniform dc magnetic field where neither magnetic substance such as a submarine cable nor direct current is present to measure correlation between the bearings of the submersible robot during such rotation and the output of the differential triaxial orthogonal dc magnetic sensing units; such data are stored in a memory. By use of the data retrieved from the memory, any variation in the output of the differential triaxial orthogonal dc magnetic sensing units due to the rotation of the submersible robot is compensated for.

The differential triaxial orthogonal dc magnetic sensing units are fixed to and enclosed in a container to prevent the distortion of the axes of the dc magnetic sensing elements due to expansion or contraction thereof caused by seawater pressure in deep sea and changes in the temperature of seawater; the container is securely attached to a pressure-resistant vessel through a soft buffer such as a rubber member.

The container enclosing the differential triaxial orthogonal dc magnetic sensing units is made of high strength insulating material.

DESCRIPTION OF THE PREFERRED EMBODIMENTS

The invention disclosed herein will be understood better with reference to the drawings stated as above.

Figure 1:
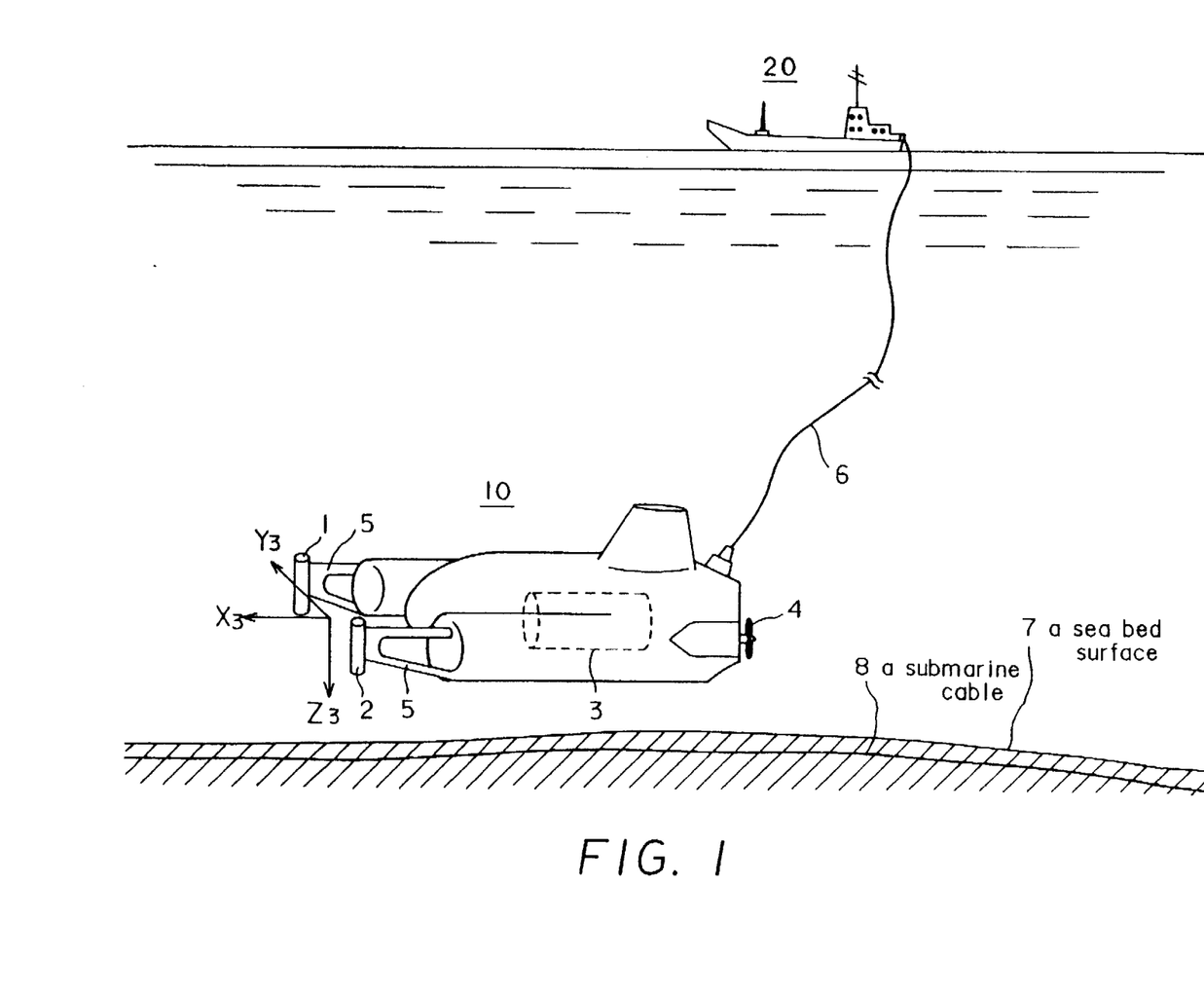
FIG. 1 illustrates an operation to detect a submarine cable by the submarine cable locating system according to the invention.

FIG. 1 illustrates an operation to locate a submarine cable by a submarine cable locating system according to the invention. In the figure, reference numeral 7 indicates a sea bed surface, 8 a submarine cable buried under the sea bed surface, 10 a remotely operated submersible robot, and 20 a mother ship; reference numerals 1 and 2 indicate two differential triaxial orthogonal dc magnetic sensing units, 3 an electronic circuit casing, 4 a thruster, and 5 support frames, all of which are installed in the submersible robot 10. Reference numeral 6 indicates a tether cable connecting the submersible robot 10 to the mother ship 20.

The two differential triaxial orthogonal dc magnetic sensing units 1 and 2 are fixedly attached to the support frames 5 provided on the right and left sides of the forward part of the submersible robot 10, respectively, but as far off as possible therefrom to minimize the effect of a dc magnetic field created by the body of the submersible robot 10 which is made of magnetic material such as steel or the like.

Also the submersible robot 10 is provided with a buoyancy member (not shown) to reduce its underwater weight to zero enabling it to move about freely, back and forth, and right and left, by means of a plurality of thrusters 4.

The submersible robot 10 connected to the mother ship 20 through the tether cable 6 is supplied with electric power by the mother ship 20 and remotely operated by an operator on board the mother ship.

The submersible robot 10 is further provided with, although not shown, an inclinometer for measuring the attitude thereof, a TV camera, a water jetting device used in burying a submarine cable, and the like. Signals of various sensors and the TV camera are transmitted in real time via a signal transmitter housed in the electronic circuit casing 3 and the tether cable 6 to the mother ship 20 to be monitored by the operator.

FIG. 1 shows a coordinate system $(X_3, Y_3, Z_3)$ fixed to the submersible robot; the X3-axis points straight forward from the submersible robot, the $Y_3$-axis extends to the right viewed from the submersible robot, and the $Z_3$-axis extends straight downward from the submersible robot while the origin of the coordinate system is positioned substantially at the center between the two differential triaxial orthogonal dc magnetic sensing units. The coordinate system will be used hereafter in explaining a method of computing the position and direction of a submarine cable.

Figure 2:
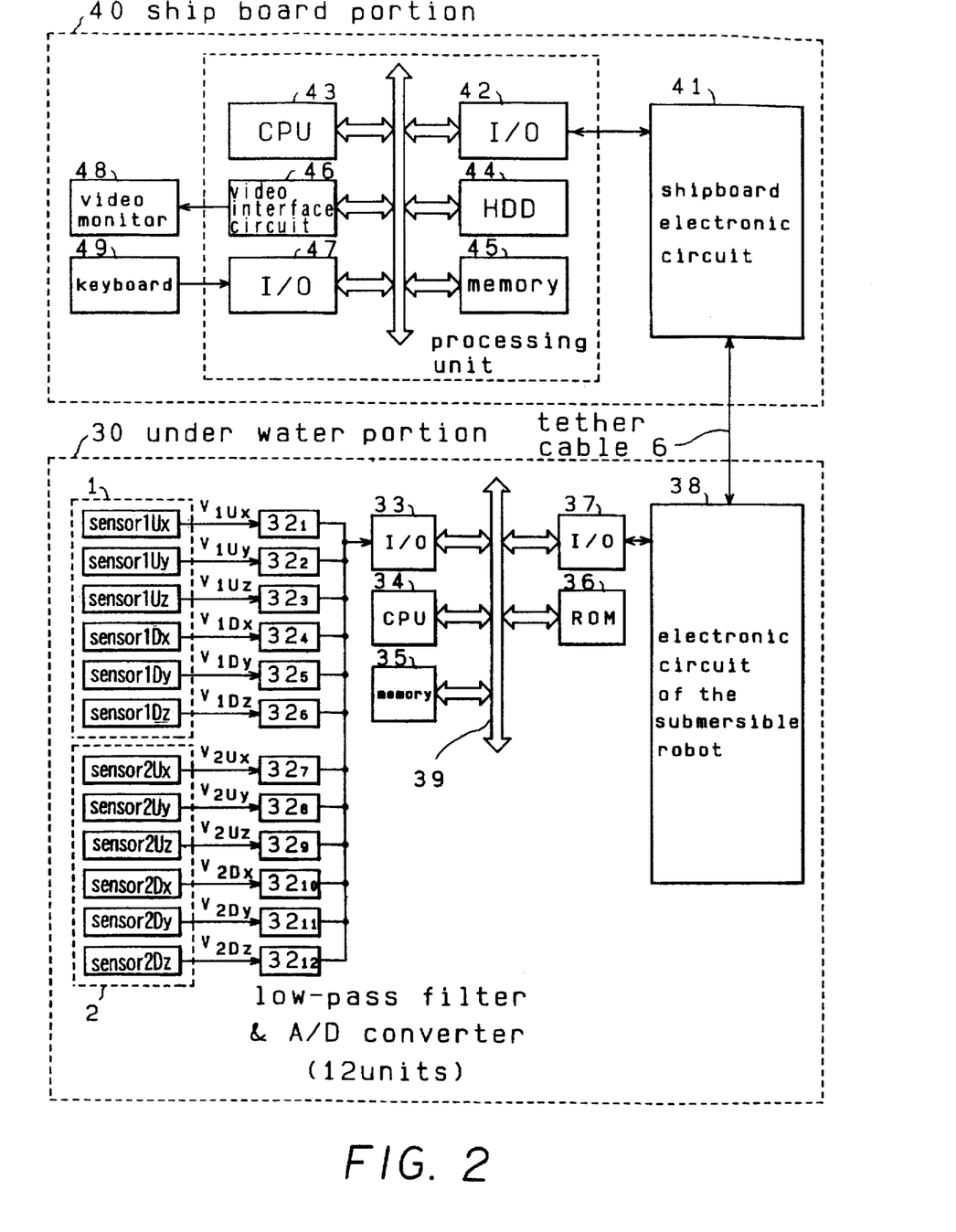
FIG. 2 is a block diagram showing the shipboard and underwater portions of a submarine cable locating system according to the invention.

FIG. 2 is a block diagram showing a system constitution of an embodiment according to the invention.

In this figure, reference numeral 30 denotes an underwater portion mounted in the submersible robot 10 and 40 a shipboard portion in the mother ship 20.

In this embodiment, two differential triaxial orthogonal dc magnetic sensing units 1 and 2 as stated above are in use, each comprising two triaxial orthogonal dc magnetic sensors; each of the triaxial orthogonal dc magnetic sensors incorporates therein three dc magnetic sensing elements. The dc magnetic sensing elements in use are of the type having sensitivity toward a specific axial direction only, for example, flux gate type magnetic sensing elements.

Thus, in this embodiment, twelve units in total of the dc magnetic sensing elements are provided. In FIG. 2, the dc magnetic sensing elements are designated sensor $1U_x$, sensor $1U_y$, sensor $1U_z$, sensor $1D_x$, sensor $1D_y$, sensor $1D_z$, sensor $2U_x$, sensor $2U_y$, sensor $2U_z$, sensor $2D_x$, sensor $2D_y$, and sensor $2D_z$, respectively, where numerals 1 and 2 after "sensor" denote identification numbers for each of the two differential triaxial orthogonal dc magnetic sensing units whereas symbols "U" and "D" denote identification numbers for each of the two triaxial orthogonal dc magnetic sensors constituting respective differential triaxial orthogonal dc magnetic sensing units, and suffixes "x", "y", and "z" indicate the direction of sensitivity of each of the three dc magnetic sensing elements constituting respective triaxial orthogonal dc magnetic sensors.

In the underwater portion 30, reference numerals 1 and 2 denote the differential triaxial orthogonal dc magnetic sensing units, $32_1$ through $32_{12}$ are respective electronic circuits each comprising a low-pass filter and an A/D converter, 33 and 37 are interface circuits, 34 is a central processing unit (CPU) for controlling the whole of the underwater portion 30, 35 is a memory (RAM), 36 is a ROM storing a control program and the like and 38 is an electronic circuit of the submersible robot 10 proper incorporating a signal transmitter for transferring signals to the shipboard portion 40 via the tether cable 6. Further, reference numeral 39 indicates a bus for transferring signals among the CPU 34, the memory 35, the ROM 36, and the interfaces 33 and 37.

In the shipboard portion 40, reference numeral 41 denotes a shipboard electronic circuit for the submersible robot 10 incorporating a signal transmitter for transferring data between the shipboard portion 40 and the underwater portion 30, 42 is an interface circuit connected to the shipboard electronic circuit 41 for the submersible robot, 43 is a CPU, 44 is a memory such as a hard disk and the like, 45 is a memory, 46 is a video interface circuit, and 47 is an interface circuit for a keyboard 49; reference numerals 42 through 47 constitute a processing unit. Further, reference numeral 48 denotes a video monitor (display) connected to the video interface circuit 46 and 49 is the keyboard connected to the interface circuit 47.

In the system constituted as above, output signals, $V_{1Ux}$, $V_{1Uy}$, $V_{1Uz}$, $V_{1Dx}$, $V_{1Dy}$, $V_{1Dz}$, $V_{2Ux}$, $V_{2Uy}$, $V_{2Uz}$, $V_{2Dx}$, $V_{2Dy}$, and $V_{2Dz}$ sent out, respectively, from each of the twelve dc magnetic sensing elements, $1U_x$ to $1U_z$, $1D_x$ to $1D_z$, $2U_x$ to $2U_z$, and $2D_x$ to $2D_z$, incorporated in the two differential triaxial orthogonal dc magnetic sensing units, respectively, are input to the electronic circuits, $32_1$ to $32_{12}$, each comprising a low-pass filter and an A/D converter and converted into digital signals by each of twelve A/D converters after passing through each of the twelve low-pass filters. Output signals sent out from respective electronic circuits $32_1$ to $32_{12}$ after analog-to-digital conversion are read into the CPU 34 via the interface circuit 33 and the bus 39, and after preprocessing such as filtering, delivered to the signal transmitter in the underwater electronic circuit 38 inside the underwater portion of the submersible robot via the interface circuit 37 for transmission to the shipboard portion 40 via a signal transmission route within the tether cable 6.

In the shipboard portion 40, signals transmitted via the tether cable 6 are received by the signal transmitter within the shipboard electronic circuit 41 for the submersible robot and sent out via the interface circuit 42 to the processing unit comprising the CPU 43, the memory 45, the hard disk 44, the keyboard 49, the video interface 46, the interface (I/O) circuit 47, and the like wherein data are processed to compute the position and direction of the submarine cable 8. The results obtained by such processing of the data are displayed on the video monitor 48 and stored in the hard disk 44 simultaneously.

Figure 3A:
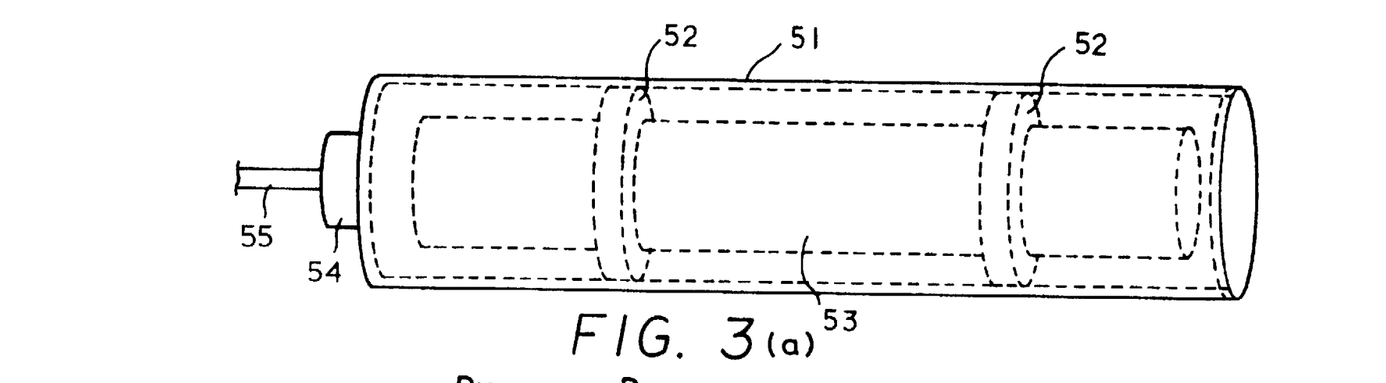
FIG. 3(a) is an external view of a differential triaxial orthogonal dc magnetic sensing unit.
Figure 3B:
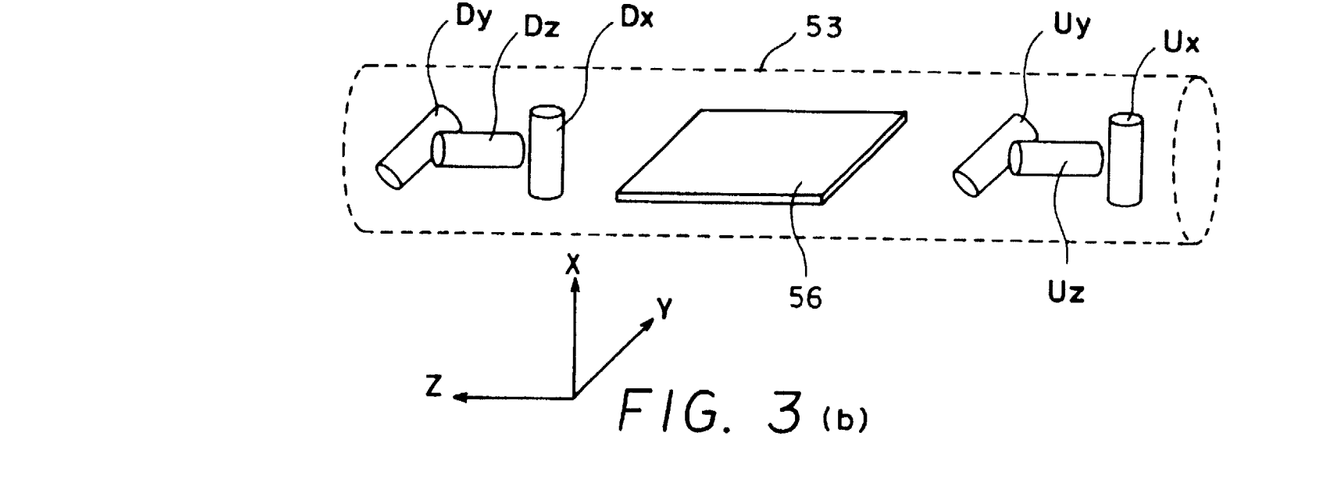
FIG. 3(b) shows a constitution inside a cylindrical container enclosing a differential triaxial orthogonal dc magnetic sensing unit.

An Embodiment of a Differential Triaxial Orthogonal dc Magnetic Sensing Unit According to the Invention FIG. 3(a) and (b) illustrate a form of the constitution of a differential triaxial orthogonal dc magnetic sensing unit according to the invention. FIG. 3(a) is an external view of a differential triaxial orthogonal dc magnetic sensing unit showing a pressure-resistant vessel 51, buffer members 52, a cylindrical container 53 made of molten quartz, an underwater connector 54, and an underwater cable 55 for delivering the output of the differential triaxial orthogonal dc magnetic sensing unit to the electronic circuit installed inside the submersible robot 10 proper. As shown in the figure, the cylindrical container 53 made of molten quartz is secured inside the pressure-resistant vessel 51 by the medium of the buffer members 52 made of soft material, for example, rubber and the like. FIG. 3(b) shows the inside of the cylindrical container 53 made of molten quartz. As shown in the figure, the cylindrical container 53 made of molten quartz contains a first triaxial orthogonal dc magnetic sensor incorporating three dc magnetic sensing elements, $U_x$, $U_y$ and $U_z$, each having sensitivity to the direction of X-axis, Y-axis, and Z-axis, respectively, and a second triaxial orthogonal dc magnetic sensor incorporating three dc magnetic sensing elements, $D_x$, $D_y$, and $D_z$, each having sensitivity to the direction of X-axis, Y-axis, and Z-axis, respectively; the first and second triaxial orthogonal dc magnetic sensors are spaced a predetermined distance apart and combined to form a differential triaxial orthogonal dc magnetic sensing unit. Further, an electronic circuit 56 is installed between the first and second triaxial orthogonal sensors; the electronic circuit 56 together with the dc magnetic sensing units, $U_x$, $U_y$, $U_z$, $D_x$, $D_y$, and $D_z$ are embedded in synthetic resin (not shown) in the shape of a cylinder, which is inserted in the cylindrical container 53 made of molten quartz.

In this embodiment of the invention, distortion of the cylindrical container 53 made of molten quartz is prevented because distortion, if any, occurring to the pressure-resistant vessel 51 due to changes in the temperature of seawater and the pressure of seawater is absorbed by the buffer members 52, protecting the differential triaxial orthogonal dc magnetic sensing units in the cylindrical container 53 from the effect of such distortion. Accordingly, the risk of axial deviation occurring to the dc magnetic sensing elements due to changes in the temperature of seawater and the pressure of seawater can be drastically reduced. In this embodiment, the material used for the cylindrical container 53 was molten quartz, but need not be limited to the same. Any material other than molten quartz may be used for the purpose as long as it has high Young's modulus and low coefficient of thermal expansion.

Normally, metal is employed as material for the pressure-resistant vessel 51 for use in deep sea, but when a metallic pressure-resistant vessel moves about underwater crossing the terrestrial magnetic field, eddy currents are generated inside the metal, causing disturbance in the magnetic field surrounding the dc magnetic sensing elements owing to a magnetic field created by the eddy currents. The problem of such disturbance in the magnetic field generating noises in the output of the dc magnetic sensing elements may be solved by use of insulating synthetic resin in place of metal as material for the pressure-resistant vessel.

Method of Computing the Position and Direction of Submarine Cable Laid Down

EXAMPLE 1

The computation method to obtain the position and direction of a submarine cable laid down by using the two differential triaxial orthogonal dc magnetic sensing units constituted as above is explained hereafter.

Figure 4:
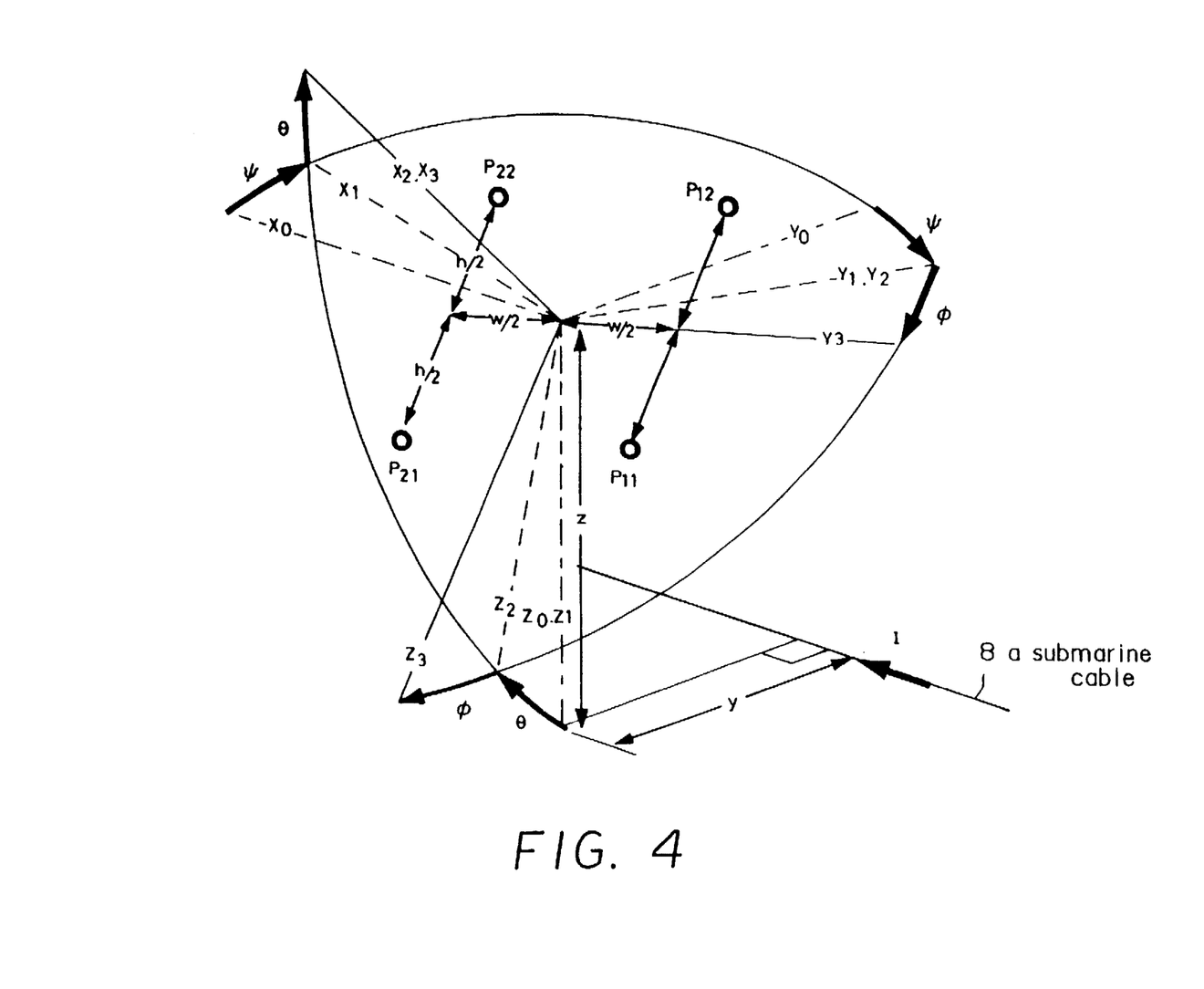
FIG. 4 illustrates coordinate systems employed for computation of the position and direction of a submarine cable laid down.

FIG. 4 is a diagrammatic illustration of coordinate systems for explaining the position and direction of a submarine cable; in this figure, $X_3$, $Y_3$, and $Z_3$ axes represent a coordinate system fixed to the submersible robot 10 as shown in FIG. 1 while $X_0$, $Y_0$, and $Z_0$ axes represent a coordinate system fixed to the surface of the earth. The position vectors of four triaxial orthogonal dc magnetic sensors constituting two units of the differential triaxial orthogonal dc magnetic sensing units 1 and 2, respectively, are denoted by vector $P_{11}^{(3)}=(0, w/2, h/2)$, vector $P_{12}^{(3)}=(0, w/2, -h/2)$, vector $P_{21}^{(3)}=(0, -w/2, h/2)$, vector $P_{22}^{(3)}=(0, -w/2, -h/2)$ respectively, wherein suffix (3) indicates that the position vector values are expressed by the coordinate system ($X_3$, $Y_3$, $Z_3$) fixed to the submersible robot 10, w is the distance between the two differential triaxial orthogonal dc magnetic sensing units 1 and 2, and h is the distance between the two triaxial orthogonal dc magnetic sensors incorporated in each of the differential triaxial orthogonal dc magnetic sensing units. The sensitive directions of respective dc magnetic sensing elements are in parallel with $X_3$-axis, $Y_3$-axis, or $Z_3$-axis, respectively, and the direction of $X_0$-axis is defined to be in parallel with the cable 8.

Euler's angles denoting the degrees of rotation of the submersible robot are designated , $\phi$, $\theta$, and $\psi$, respectively, in other words, a coordinate system ($X_1$, $Y_1$, $Z_1$) is set up by rotating the coordinate system $(X_0, Y_0, Z_0)$ by $\psi$ around the $Z_0$-axis, a coordinate system $(X_2, Y_2, Z_2)$ is set up by rotating the coordinate system $(X_1, Y_1, Z_1)$ by $\theta$ around the $Y_1$-axis and finally a coordinate system of $(X_3, Y_3, Z_3)$ is set up by rotating the coordinate system $(X_2, Y_2$ and $Z_2)$ by $\phi$ around the $X_2$-axis where $\psi$ is a crossing angle formed by the submersible robot 10 and the cable 8 while $\theta$ and $\phi$ correspond to the magnitude of pitching and rolling of the submersible robot, respectively; the pitching angle $\theta$ and the rolling angle $\phi$ can be measured by an inclinometer mounted in the submersible robot 10.

The dc magnetic field vectors at position vectors $P_{11}^{(3)}$ and $P_{12}^{(3)}$ are denoted by vector $H_{11}^{(3)}=(H_{11x}^{(3)}, H_{11y}^{(3)}, H_{11z}^{(3)})$ and vector $H_{12}^{(3)}=(H_{12x}^{(3)}, H_{12y}^{(3)}, H_{12z}^{(3)})$, respectively. Then, $\Delta H_1^{(3)}$, which is a difference between the vector $H_{11}^{(3)}$ and the vector $H_{12}^{(3)}$, is defined by the following formulas:

$$\Delta H_1^{(3)}=(\Delta H_{1x}^{(3)}, \Delta H_{1y}^{(3)}, \Delta H_{1z}^{(3)}) \quad (1)$$

$$\Delta H_{1x}^{(3)}=H_{11x}^{(3)}-H_{12x}^{(3)} \quad (2)$$

$$\Delta H_{1y}^{(3)}=H_{11y}^{(3)}-H_{12y}^{(3)} \quad (3)$$

$$\Delta H_{1z}^{(3)}=H_{11z}^{(3)}-H_{12z}^{(3)} \quad (4)$$

where $\Delta H_{1x}^{(3)}$, $\Delta H_{1y}^{(3)}$, and $\Delta H_{1z}^{(3)}$, which are the X-axis component, Y-axis component, and Z-axis component, respectively, of $\Delta H_1^{(3)}$, shown in the formulas (2) to (4) above are none other than the output of the differential triaxial orthogonal dc magnetic sensing unit 1.

Using the aforesaid outputs $\Delta H_{1x}^{(3)}$, $\Delta H_{1y}^{(3)}$ and $\Delta H_{1z}^{(3)}$, the crossing angle (relative azimuth) $\psi$ between the submarine cable 8 and the submersible robot 10 is obtained by the following formula (5):

$$\psi = \tan^{-1}\left(\frac{\Delta H_{1x}^{(3)}\cos\theta + \Delta H_{1y}^{(3)}\sin\phi\sin\theta + \Delta H_{1z}^{(3)}\cos\phi\sin\theta}{\Delta H_{1y}^{(3)}\cos\phi - \Delta H_{1z}^{(3)}\sin\phi}\right) \quad (5)$$

(formula (5) is derived)

Transformation (T) of the coordinate system $(X_0, Y_0, Z_0)$ to the coordinate system $(X_3, Y_3, Z_3)$ is expressed as follows:

$$\begin{pmatrix} X_3 \\ Y_3 \\ Z_3 \end{pmatrix} = T \begin{pmatrix} X_0 \\ Y_0 \\ Z_0 \end{pmatrix} \quad (6)$$

$$T = \begin{pmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{pmatrix} \quad (7)$$

$$T^{-1} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{pmatrix} \quad (8)$$

The magnetic field at position $P_{11}$ is expressed by the coordinate system $(X_3, Y_3, Z_3)$ and the coordinate system $(X_0, Y_0, Z_0)$ as follows:

$$H_{11}^{(3)} = \begin{pmatrix} H_{11x}^{(3)} \\ H_{11y}^{(3)} \\ H_{11z}^{(3)} \end{pmatrix} \quad (9)$$

$$H_{11}^{(0)} = \begin{pmatrix} H_{11x}^{(0)} \\ H_{11y}^{(0)} \\ H_{11z}^{(0)} \end{pmatrix} \quad (10)$$

As $H_{11x}^{(0)}=0$, the following formula results from formulas (6) and (8) above:

$$H_{11x}^{(0)} = \cos\theta\cos\psi H_{11x}^{(3)} + (\sin\phi\sin\theta\cos\psi - \cos\phi\sin\psi) H_{11y}^{(3)} + (\cos\phi\sin\theta\cos\psi + \sin\phi\sin\psi) H_{11z}^{(3)} = 0 \quad (11)$$

Similarly, expressing the magnetic field at $P_{12}$ by the coordinate system $(X_3, Y_3, Z_3)$ and the coordinate system $(X_0, Y_0, Z_0)$ and as $H_{12x}^{(0)}=0$, the following formula results:

$$H_{12x}^{(0)} = \cos\theta\cos\psi H_{12x}^{(3)} + (\sin\phi\sin\theta\cos\psi - \cos\phi\sin\psi) H_{12y}^{(3)} + (\cos\phi\sin\theta\cos\psi + \sin\phi\sin\psi) H_{12z}^{(3)} = 0 \quad (12)$$

Formula (5) above is derived from the formulas (2) to (4) and (11) and (12) above.

A horizontal distance y to a submarine cable 8 and an elevation difference z of the submarine cable 8 are computed by the following formulas (13) and (14):

$$y = -\Delta H_{1z}^{(0)}\sqrt{\frac{hI}{4\pi(\Delta H_{1y}^{(0)} \pm |\Delta H_1^{(0)}|)\Delta H_1^{(0)2}}} + \frac{w\cos\psi}{2} \quad (13)$$

$$z = \sqrt{\frac{hI(\Delta H_{1y}^{(0)} \pm |\Delta H_1^{(0)}|)}{4\pi\Delta H_1^{(0)2}}} \quad (14)$$

Then, $\Delta H_{1y}^{(0)}$, $\Delta H_{1z}^{(0)}$, and $|\Delta H_1^{(0)}|$ are obtained by the following formulas (15) and (16):

$$\begin{pmatrix} \Delta H_{1x}^{(0)} \\ \Delta H_{1y}^{(0)} \\ \Delta H_{1z}^{(0)} \end{pmatrix} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{pmatrix} \begin{pmatrix} \Delta H_{1x}^{(3)} \\ \Delta H_{1y}^{(3)} \\ \Delta H_{1z}^{(3)} \end{pmatrix} \quad (15)$$

$$|\Delta H_1^{(0)}| = \sqrt{(\Delta H_{1y}^{(0)})^2 + (\Delta H_{1z}^{(0)})^2} \quad (16)$$

Now, I represents the value for the amount of dc flowing in the submarine cable 8 and is defined positive when flowing in the direction of the arrow along $+X_0$-axis as shown in FIG. 4. The value I of dc supplied to the submarine cable can be measured normally at a terminal station onshore. (formulas (13) and (14) are derived)

Figure 5:
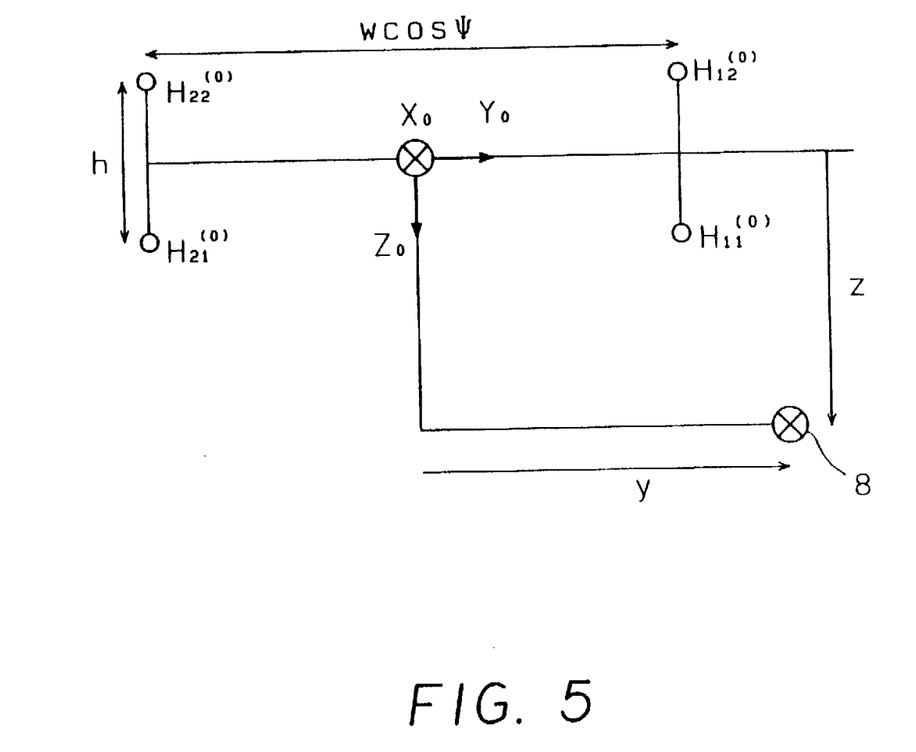
FIG. 5 illustrates a coordinate system employed for computation of the position of a submarine cable.

In this exemplary computation, the pitching $\theta$ and the rolling $\phi$ of the submersible robot 10 are computed on the coordinate system $(X_0, Y_0, Z_0)$ on the assumption that the values thereof are negligible. FIG. 5 shows the coordinate system employed in this computation. In this case, w cos $\psi$ represents the distance between the two differential triaxial orthogonal dc magnetic sensing units 1 and 2.

Whereupon, the magnetic vectors $H_{11}^{(O)}$ and $H_{12}^{(O)}$ at position $P_{11}^{(O)}$ and $P_{12}^{(O)}$, respectively, are expressed as follows:

$$H_{11x}^{(O)} = 0 \tag{17}$$

$$H_{11y}^{(O)} = \frac{I}{2\pi} \frac{z - h/2}{(y - w'/2)^2 + (z - h/2)^2} \tag{18}$$

$$H_{11z}^{(O)} = \frac{I}{2\pi} \frac{-(y - w'/2)}{(y - w'/2)^2 + (z - h/2)^2} \tag{19}$$

$$H_{12x}^{(O)} = 0 \tag{20}$$

$$H_{12y}^{(O)} = \frac{I}{2\pi} \frac{z - h/2}{(y - w'/2)^2 + (z + h/2)^2} \tag{21}$$

$$H_{12z}^{(O)} = \frac{I}{2\pi} \frac{-(y - w'/2)}{(y - w'/2)^2 + (z + h/2)^2} \tag{22}$$

where $$w' = w \cos \psi \tag{23}$$

Herein, the following approximation is employed:

$$1 >> \frac{\frac{1}{4} h^2}{(y - w'/2)^2 + z^2} \tag{24}$$

$$1 >> \left( \frac{hz}{(y - w'/2)^2 + z^2} \right)^2 \tag{25}$$

The following formula (26) is derived from formulas (24) and (25) above:

$$\frac{1}{(y - w'/2)^2 + (z \pm h/2)^2} = \tag{26}$$
$$\frac{1}{(y - w'/2)^2 + z^2} \left( 1 \mp \frac{hz}{(y - w'/2)^2 + z^2} \right)$$

Employing formula (26), the formulas (17)~(22) can be converted to the following formulas (27)~(32):

$$H_{11x}^{(O)} = 0 \tag{27}$$

$$H_{11y}^{(O)} = \frac{I}{2\pi} \frac{(z - h/2)}{(y - w'/2)^2 + z^2} \left( 1 + \frac{hz}{(y - w'/2)^2 + z^2} \right) \tag{28}$$

$$H_{11z}^{(O)} = -\frac{I}{2\pi} \frac{(y - w'/2)}{(y - w'/2)^2 + z^2} \left( 1 + \frac{hz}{(y - w'/2)^2 + z^2} \right) \tag{29}$$

$$H_{12x}^{(O)} = 0 \tag{30}$$

$$H_{12y}^{(O)} = \frac{I}{2\pi} \frac{(z + h/2)}{(y - w'/2)^2 + z^2} \left( 1 - \frac{hz}{(y - w'/2)^2 + z^2} \right) \tag{31}$$

$$H_{12z}^{(O)} = -\frac{I}{2\pi} \frac{(y - w'/2)}{(y - w'/2)^2 + z^2} \left( 1 - \frac{hz}{(y - w'/2)^2 + z^2} \right) \tag{32}$$

$\Delta H_{1y}^{(O)}$, $\Delta H_{1z}^{(O)}$, and $\Delta H_1^{(O)}$ are defined as follows:

$$\Delta H_{1y}^{(O)} = H_{11y}^{(O)} - H_{12y}^{(O)} \tag{33}$$
$$= \frac{hI}{2\pi} \frac{-(y - w'/2)^2 + z^2}{((y - w'/2)^2 + z^2)^2}$$

$$\Delta H_{1z}^{(O)} = H_{11z}^{(O)} - H_{12z}^{(O)} \tag{34}$$
$$= -\frac{hI}{\pi} \frac{z(y - w'/2)}{((y - w'/2)^2 + z^2)^2}$$

$$\Delta H_1^{(O)2} = \Delta H_{1y}^{(O)2} + \Delta H_{1z}^{(O)2} \tag{35}$$
$$= \left( \frac{hI}{2\pi} \right)^2 \frac{1}{((y - w'/2)^2 + z^2)^2}$$

Substituting formula (35) for formulas (33) and (34), the following formulas are obtained:

$$\Delta H_{1y}^{(O)} = \frac{2\pi}{hI} \Delta H_1^{(O)2} (-(y - w'/2)^2 + z^2) \tag{36}$$

$$\Delta H_{1z}^{(O)} = -\frac{4\pi}{hI} \Delta H_1^{(O)2} z(y - w'/2) \tag{37}$$

If $$Z^2 = \frac{2\pi \Delta H_1^{(O)2}}{hI} z^2 \tag{38}$$

the following formula is obtained from the formulas (36) and (37):

$$Z^2 = \frac{\Delta H_{1y}^{(O)} \pm \sqrt{\Delta H_1^{(O)2}}}{2} \tag{39}$$

If the direction of direct current flowing through the submarine cable 8 is along $+X_0$-axis and $I>0$, the result is limited to one solution as follows since $Z^2 > 0$ is derived from formula (38):

$$Z^2 = \frac{\Delta H_{1y}^{(O)} + |\Delta H_1^{(O)}|}{2} \tag{40}$$

Also, since $z>0$, the following formula results from formulas (38) and (40):

$$z = \sqrt{\frac{hI(\Delta H_{1y}^{(O)} + |\Delta H_1^{(O)}|)}{4\pi \Delta H_1^{(O)2}}} \tag{41}$$

Further, from formulas (23), (37), and (41), the following formulas result:

$$y = -\frac{hI \Delta H_{1z}^{(O)}}{4\pi z \Delta H_1^{(O)2}} + \frac{w \cos \psi}{2} \tag{42}$$

$$y = -\Delta H_{1z}^{(O)} \sqrt{\frac{hI}{4\pi (\Delta H_{1y}^{(O)} + |\Delta H_1^{(O)}|) \Delta H_1^{(O)2}}} + \frac{w \cos \psi}{2} \tag{43}$$

If direct current flows in the opposite direction, $I<0$. Therefore, $Z^2<0$ from formula (38). Then, formula (39) turns as follows:

$$Z^2 = \frac{\Delta H_{1y}^{(O)} - |\Delta H_1^{(O)}|}{2} \tag{44}$$

Accordingly, since $z>0$, the following formula results from formulas (38) and (44):

$$z = \sqrt{\frac{hl(\Delta H_{1y}^{(0)} - |\Delta H_1^{(0)}|)}{4\pi \Delta H_1^{(0)2}}} \quad (45)$$

Also, from formulas (23), (37), and (45), the following formulas result:

$$y = -\frac{hl\Delta H_{1z}^{(0)}}{4\pi z \Delta H_1^{(0)2}} + \frac{w\cos\psi}{2} \quad (46)$$

$$y = +\Delta H_{1z}^{(0)} \sqrt{\frac{hl}{4\pi(\Delta H_{1y}^{(0)} - |\Delta H_1^{(0)}|)\Delta H_1^{(0)2}}} + \frac{w\cos\psi}{2} \quad (47)$$

In the same way, the angle and position of the submarine cable can be computed using the vector $H_{21}^{(O)}$ and $H_{22}^{(O)}$. When estimating in practice on the position of the submarine cable, adopting the mean value of the computation results of the sensing units disposed on both sides is preferable.

As stated in the foregoing, the symbol before $|\Delta H_i^{(O)}|$ in formulas (13) and (14) is "+" if I>0 and "−" if I<0. Therefore, if the direction of direct current is already known, the relative position and direction of the submarine cable is obtainable from the formulas (5) and (13) stated above using one of the differential triaxial orthogonal dc magnetic sensing units.

However, if the direction of direct current I is unknown, the relative position y and z of the submarine cable 8 is obtainable by the following procedure using the two differential triaxial orthogonal dc magnetic sensing units.

Assuming that I>0, the relative position of the submarine cable is computed as follows using the outputs of the differential triaxial orthogonal dc magnetic sensing units on both sides and formulas (13) and (14):

$$\Delta D_+ = \sqrt{(y_{1+} - y_{2+})^2 + (z_{1+} - z_{2+})^2} \quad (48)$$

where the computation results by the sensing unit 1 (position vector $P_{11}$ and $P_{12}$) on the right side are $y_{1+}$ and $z_{1+}$, same by the sensing unit 2 (position vector $P_{21}$ and $P_{22}$) on the left side are $y_{2+}$ and $Z_{2+}$, and a difference in the results of computation on the relative position of the submarine cable between the sensing units on both sides of the submersible robot is $\Delta D_+$.

Then, assuming that I<0, the relative position of the submarine cable is computed in the same way as stated above using the outputs of the differential triaxial orthogonal dc magnetic sensing units on both sides and formulas (13) and (14) as follows:

$$\Delta D_- = \sqrt{(y_{1-} - y_{2-})^2 + (z_{1-} - z_{2-})^2} \quad (49)$$

where the computation results by the sensing unit 1 (position vector $P_{11}$ and $P_{12}$) on the right side are $y_{1-}$ and $z_{1-}$, same by the sensing unit 2 (position vector $P_{21}$ and $P_{22}$) on the left side are $y_{2-}$ and $z_{2-}$ and a difference in the results of computation on the relative position of the submarine cable between the sensing units on both sides of the submersible robot is $\Delta D$.

By computer simulation, it is confirmed that $\Delta D_- > \Delta D_+$ in case of I>0 and $\Delta D < \Delta D_+$ in case of I<0.

Thus, the relative position of the submarine cable is obtained from formulas (13) and (14) by assuming that I>0 in case of $\Delta D_- > \Delta D_+$ and I<0 in case of $\Delta D_- < \Delta D_+$.

Accordingly, even if the direction of the submarine cable is unknown, the relative position and direction of the submarine cable is determined by use of the two differential triaxial orthogonal dc magnetic sensing units.

However, as stated in the foregoing, formulas (13) and (14) are derived by use of an approximation method as shown in formulas (24) and (25). Therefore, if the position of the submarine cable 8 is close to the differential triaxial orthogonal dc magnetic sensing unit 1 or 2, the approximation of formulas (24) and (25) becomes unfit, increasing computation errors.

Accordingly, when the two differential triaxial orthogonal dc magnetic sensing units are in use, one each on the right and left sides, such errors can be reduced by adopting the mean of computation results by the respective sensing units on both sides as the measurement results.

Method of Computing the Position and Direction of Submarine Cable Laid Down

EXAMPLE 2

When using four differential triaxial orthogonal dc magnetic sensing units, the relative position and direction of the submarine cable is obtainable by a strict solution given below.

In this case, the four differential triaxial orthogonal dc magnetic sensing units are disposed at equal spacings from each other.

The positions of the triaxial orthogonal dc magnetic sensors constituting respective differential triaxial orthogonal dc magnetic sensing units are expressed by the following formula using the coordinate system ($X_3$, $Y_3$, $Z_3$) fixed to the submersible robot.

$$P_{ij}=(0, s_jw/2, t_jh/2) \ (s_1=1, s_2=\frac{1}{3}, s_3=-\frac{1}{3}, s_4=-1, t_1=1, t_2=-1) \quad (50)$$

where i and j denote the numbers assigned to respective differential triaxial orthogonal dc magnetic sensing units (i=1, 2, 3, 4, j=1, 2). The sensitivity directions of respective dc magnetic sensing elements incorporated therein are in parallel with $X_3$-axis, $Y_3$-axis, or $Z_3$-axis.

Firstly, $h_i$, $D_{i1}$, $D_{i2}$, $D_{i4}$, and $E_i$, are defined as follows:

$$h_i = \frac{\Delta H_{iy}^{(3)}}{\Delta H_{iz}^{(3)}} \quad (51)$$

$$\Delta H_{iy}^{(3)} = H_{i1y}^{(3)} - H_{i2y}^{(3)} \quad (52)$$

$$\Delta H_{iz}^{(3)} = H_{i1z}^{(3)} - H_{i2z}^{(3)} \quad (53)$$

$$D_{i1} = h_i(\sin\psi \cos\phi \sin\theta - \cos\psi \sin\phi) - \cos\phi \cos\theta \quad (54)$$

$$D_{i2} = -2(h_i \cos\phi \cos\theta + \sin\psi \cos\phi \sin\theta - \cos\psi \sin\phi) \quad (55)$$

$$D_{i3} = -s_i w \cos\psi \cos\theta \quad (56)$$

$$D_{i4} = -s_i h_i w \cos\psi \cos\theta \quad (57)$$

$$E_i = \frac{1}{4}(s_i^2 w^2 + h^2)(h_i(\sin\psi \cos\phi \sin\theta - \cos\psi \sin\phi) + \cos\phi \cos\theta) \quad (58)$$

Matrix D and vectors P and E are defined as follows:

$$D = \begin{pmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \end{pmatrix} \quad (59)$$

$$P = \begin{pmatrix} y^2 - z^2 \\ yz \\ y \\ z \end{pmatrix} \quad (60)$$

$$E = \begin{pmatrix} E_1 \\ E_2 \\ E_3 \\ E_4 \end{pmatrix} \quad (61)$$

The following relation results between the matrix D and vectors P and E:

$$DP = E \quad (62)$$

$$P = D^{-1}E \quad (63)$$

The relative position of the submarine cable can be obtained by formula (63) above; the direction of the submarine cable laid down can be obtained by formula (5) given in the foregoing.

Method of Computing the Position and Direction of Submarine Cable Laid Down

EXAMPLE 3

Another embodiment of the invention using two differential triaxial orthogonal dc magnetic sensing units is described hereafter. In this example, the magnitude of the pitching and rolling, respectively, of the submersible robot are approximated at 0 assuming that these are negligible. As is the case with Example 1, four triaxial orthogonal dc magnetic sensing units are in use in this example and the position vectors thereof are denoted as follows in the same way as example 1: $P_{11}^{(3)}=(0, w/2, h/2)$, $P_{12}^{(3)}=(0, w/2,-h/2)$, $P_{21}^{(3)}=(o, -w/2, h/2)$, $P_{22}^{(3)}=(0, -w/2, -h/2)$ The dc magnetic field vectors at position vectors, $P_{11}^{(3)}$, $P_{12}^{(3)}$, $P_{21}^{(3)}$, and $P_{22}^{(3)}$, are denoted respectively, $H_{11}^{(3)}=(H_{11x}^{(3)}, H_{11y}^{(3)}, H_{11z}^{(3)})$, $H_{12}^{(3)}=(H_{12x}^{(3)}, H_{12y}^{(3)}, H_{12z}^{(3)})$, $H_{21}^{(3)}=(H_{21x}^{(3)}, H_{21y}^{(3)}, H_{21z}^{(3)})$, and $H_{22}^{(3)}=(H_{22x}^{(3)}, H_{22y}^{(3)}, H_{22z}^{(3)})$ where suffix (3) attached thereto denote the dc magnetic field vectors as expressed by the coordinate system $(X_3, Y_3, Z_3)$ fixed to the submersible robot, in other words, the output values of aforesaid sensing units.

As is the case with Example 1, firstly, an angle j formed by the submarine cable and respective sensing units is obtained by the foregoing formula (5) and subsequently, the dc magnetic vectors at respective positions of the aforesaid sensing units are expressed by the coordinate system $(X_0, Y_0, Z_0)$ fixed to the surface of the earth as follows:

$$\begin{pmatrix} H_{ijx}^{(0)} \\ H_{ijy}^{(0)} \\ H_{ijz}^{(0)} \end{pmatrix} = \begin{pmatrix} \cos\psi & -\sin\psi & 0 \\ \sin\psi & \cos\psi & 0 \\ 0 & 0 & 1 \end{pmatrix} \begin{pmatrix} H_{ijx}^{(3)} \\ H_{ijy}^{(3)} \\ H_{ijz}^{(3)} \end{pmatrix} \quad (64)$$

where $i,j=1,2$.

Then, finite differences for respective sensing element components denoted by $\Delta H_{1x}^{(0)}$, $\Delta H_{1y}^{(0)}$, $\Delta H_{1z}^{(0)}$, $\Delta H_{2x}^{(0)}$, $\Delta H_{2y}^{(0)}$, $\Delta H_{2z}^{(0)}$, $\Delta H_{ux}^{(0)}$, $\Delta H_{uy}^{(0)}$, $\Delta H_{uz}^{(0)}$, $\Delta H_{lx}^{(0)}$, $\Delta H_{ly}^{(0)}$, $\Delta H_{lz}^{(0)}$ are defined as follows:

$$\Delta H_{1x}^{(0)} = H_{11x}^{(0)} - H_{12x}^{(0)}, \Delta H_{1y}^{(0)} = H_{11y}^{(0)} - H_{12y}^{(0)}, \Delta H_{1z}^{(0)} = \frac{H_{11y}^{(0)} - H_{12y}^{(0)}}{H_{11z}^{(0)} - H_{12z}^{(0)}} \quad (65)$$

$$\Delta H_{2x}^{(0)} = H_{21x}^{(0)} - H_{22x}^{(0)}, \Delta H_{2y}^{(0)} = \frac{H_{21y}^{(0)} - H_{22y}^{(0)}}{H_{21z}^{(0)} - H_{22z}^{(0)}}, \Delta H_{2z}^{(0)} = H_{21y}^{(0)} - H_{22y}^{(0)}$$

$$\Delta H_{ux}^{(0)} = H_{11x}^{(0)} - H_{21x}^{(0)}, \Delta H_{uy}^{(0)} = \frac{H_{11y}^{(0)} - H_{21y}^{(0)}}{H_{11z}^{(0)} - H_{21z}^{(0)}}, \Delta H_{uz}^{(0)} = H_{11y}^{(0)} - H_{21y}^{(0)}$$

$$\Delta H_{lx}^{(0)} = H_{12x}^{(0)} - H_{22x}^{(0)}, \Delta H_{ly}^{(0)} = \frac{H_{12y}^{(0)} - H_{22y}^{(0)}}{H_{12z}^{(0)} - H_{22z}^{(0)}}, \Delta H_{lz}^{(0)} = H_{12y}^{(0)} - H_{22y}^{(0)}$$

Subsequently, the ratio of y-component to z-component are denoted $R_1$, $R_2$, $R_u$, $R_l$, respectively, as follows:

$$R_1 = \frac{\Delta H_{1y}^{(0)}}{\Delta H_{1z}^{(0)}}, R_2 = \frac{\Delta H_{2y}^{(0)}}{\Delta H_{2z}^{(0)}}, R_u = \frac{\Delta H_{uy}^{(0)}}{\Delta H_{uz}^{(0)}}, R_l = \frac{\Delta H_{ly}^{(0)}}{\Delta H_{lz}^{(0)}} \quad (66)$$

Using R thus defined, together with w and h, the relative distances y and z between the submarine cable 8 and the submersible robot 10 are obtained by the following formula:

$$y = \frac{(R_u + R_l)(R_1 + R_2) - 4}{\frac{(R_u + R_l)(R_1 - R_2)}{h} + 2\frac{R_u - R_l}{w}} \quad (67)$$

$$z = \frac{(R_1 + R_2)(R_u + R_l) - 4}{2\frac{R_1 - R_2}{w} + \frac{(R_1 + R_2)(R_u - R_l)}{h}} \quad (68)$$

Accordingly, the angle ψ formed by the submarine cable and the submersible robot and the relative position of the submarine cable y and z are obtainable from the output value $H^{(3)}$ of the sensors.

Method of Display on the Mother Ship—a Form of the Embodiments of the Invention

If a submarine cable is not provided with reinforcement by armoring steel wires and direct current is available for detecting a submarine cable, the relative position and direction thereof can be computed in the manner described in the foregoing. In such a case, as shown in FIG. 6, the results of computation for the relative position of the submersible robot and the submarine cable and the direction of the submarine cable laid down can be diagrammatically shown on a display installed in the mother ship.

Figure 6:
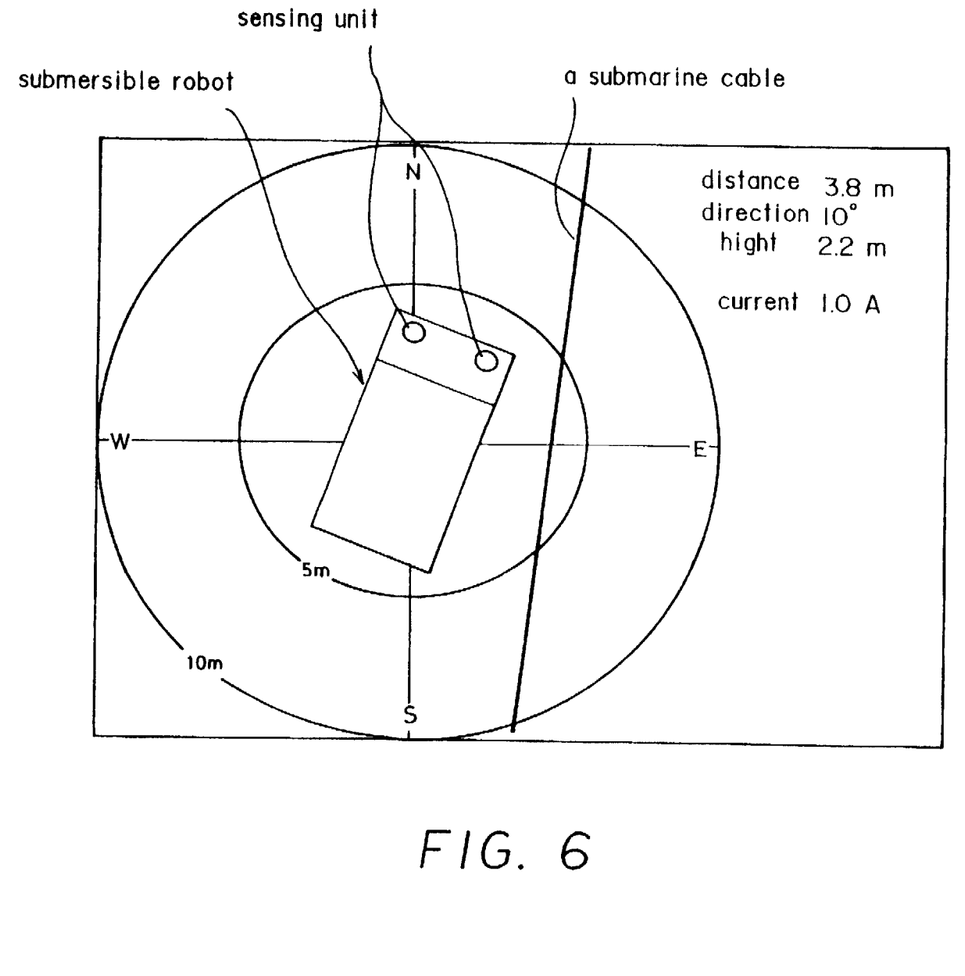
FIG. 6 shows an example of display shown on a display installed in a mother ship.

FIG. 6 shows the submersible robot 10 in the center, the bearings of the submersible robot 10, the positions of the differential triaxial orthogonal dc magnetic sensing units, the relative position and direction of the submarine cable 8, and so on. In the figure, the upper side corresponds to the north. The operator of the submersible robot can manipulate it watching the graphic.

If a submarine cable 8 is reinforced with armoring steel wires, the position of the submarine cable is not obtainable through computation on account of a dc magnetic field produced by the armoring steel wires. However, in this case, the approximate position of the submarine cable can be inferred by displaying the vectorial magnitude of the output of, for example, the differential triaxial orthogonal dc magnetic sensing unit.

The vectorial magnitude $|\Delta H^{(3)}|$ of the output of the differential triaxial orthogonal dc magnetic sensing unit is expressed by the following formula:

$$|\Delta H^{(3)}| = \sqrt{(\Delta H_x^{(3)})^2 + (\Delta H_y^{(3)})^2 + (\Delta H_z^{(3)})^2} \quad (69)$$

Figure 7:
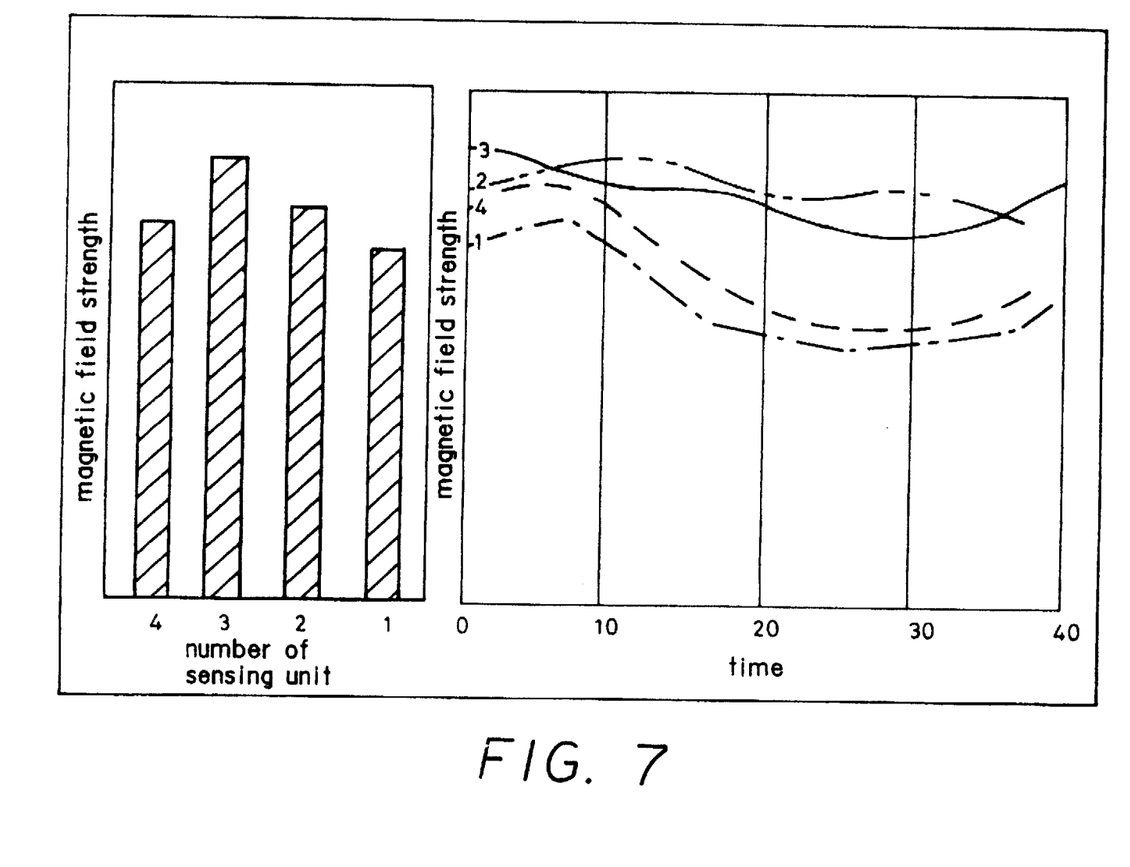
FIG. 7 shows other examples of display shown on a display installed in a mother ship.

FIG. 7 shows the vectorial magnitude $|\Delta H^{(3)}|$ of respective outputs of the differential triaxial orthogonal dc magnetic sensing units in an embodiment of the invention. In this embodiment, four differential triaxial orthogonal dc magnetic sensing units are in use, each being assigned numbers from 1 to 4. A figure on the left side is a bar graph indicating instantaneous values of the vectorial magnitude $|\Delta H^{(3)}|$ of the output of each of the sensing units and a figure on the right is a chart showing variation of $|\Delta H^{(3)}|$ with time; the horizontal-axis represents time and the vertical-axis represents the magnitude of $|\Delta H^{(3)}|$. The operator of the submersible robot can infer from this display that the submarine cable is located close to No. 2 and No. 3 differential triaxial orthogonal dc magnetic sensing units.

Elimination of the Effect of a Magnetic Field Created by the Submersible Robot

The dc magnetic sensing elements mounted in the submersible robot 10 are under the influence of a dc magnetic field created by the submersible robot 10. A magnetic field as measured represents a vectorial composite of the terrestrial magnetic field, the magnetic field created by the submarine cable, and the magnetic field created by the submersible robot 10. The effect of the magnetic field created by the submersible robot 10 is dependent on the bearings of the submersible robot 10.

Accordingly, the outputs of respective differential triaxial orthogonal dc magnetic sensing units are measured beforehand to establish a correlation between said outputs and the bearings of the submersible robot 10 by rotating the submersible robot once at a spot underwater in a uniform dc magnetic field with neither a magnetic substance such as a submarine cable present in the vicinity nor direct current flowing nearby; the data thus obtained are stored in the hard disk 44 as shown in FIG. 2 so that the effect of the dc magnetic field created by the submersible robot 10 can be eliminated by deducting the variation value dependent on the bearings of the submersible robot 10, which are already stored, from the outputs of the differential triaxial orthogonal dc magnetic sensing units as measured when detecting the submarine cable.

Correction of the Sensitivity, Offset, and Orthogonality of Sensors

On the assumption that the triaxial orthogonal dc magnetic sensors function ideally, the absolute value $|H_i|$ of a dc magnetic field is expressed as follows:

$$|H_i| = c_i \sqrt{V_{ix}^2 + V_{iy}^2 + V_{iz}^2} \qquad (101)$$

where $c_i$ is constant, and $V_{ix}$, $V_{iy}$, and $V_{iz}$ are respective outputs of three dc magnetic sensing elements constituting each of the triaxial orthogonal dc magnetic sensors; i denotes the number assigned to each of the triaxial orthogonal dc magnetic sensors.

However, in reality, signals contain offset of and error in the sensitivity of the sensing elements, and error in the orthogonality between the axes thereof. Hence, variation by several hundred nTs occurs to the result of computation by formula (101). This means that, when the sensing elements are rotated at one and the same spot, deviation by several hundred nTs will result depending on the bearings thereof.

Such offset, error in the sensitivity, and error in the orthogonality between the axes as stated above may be compensated for by the following formula:

$$\begin{pmatrix} V'_{ix} \\ V'_{iy} \\ V'_{iz} \end{pmatrix} = \begin{pmatrix} a_{i11} & a_{i12} & a_{i13} \\ a_{i21} & a_{i22} & a_{i23} \\ a_{i31} & a_{i32} & a_{i33} \end{pmatrix} \left( \begin{pmatrix} V_{ix} \\ V_{iy} \\ V_{iz} \end{pmatrix} - \begin{pmatrix} V_{ix0} \\ V_{iy0} \\ V_{iz0} \end{pmatrix} \right) \qquad (102)$$

where $V'_{ix}$, $V'_{iy}$, $V'_{iz}$ are the output of respective sensing elements after correction, $V_{ix0}$, $V_{iy0}$, $V_{iz0}$ are the output offset of respective sensing elements, and $a_{i11} \sim a_{i33}$ represent the elements of a matrix for correcting the orthogonality between the axes thereof and the sensitivity of respective axes.

By performing such compensating computation stated as above on the output of respective triaxial orthogonal dc magnetic sensors, variation in the measurement of the absolute value of a dc magnetic field maybe reduced to several nTs.

Now, the correction factors, $V_{ix0}$, $V_{iy0}$, $V_{iz0}$, $a_{i11}$ to $a_{i33}$ used in formula (102) are determined by the asymptotic method of estimation (Japanese Patent Application Laid-Open No. H7-60130) already disclosed by the applicant of the invention. An outline thereof is explained hereafter.

Figure 8:
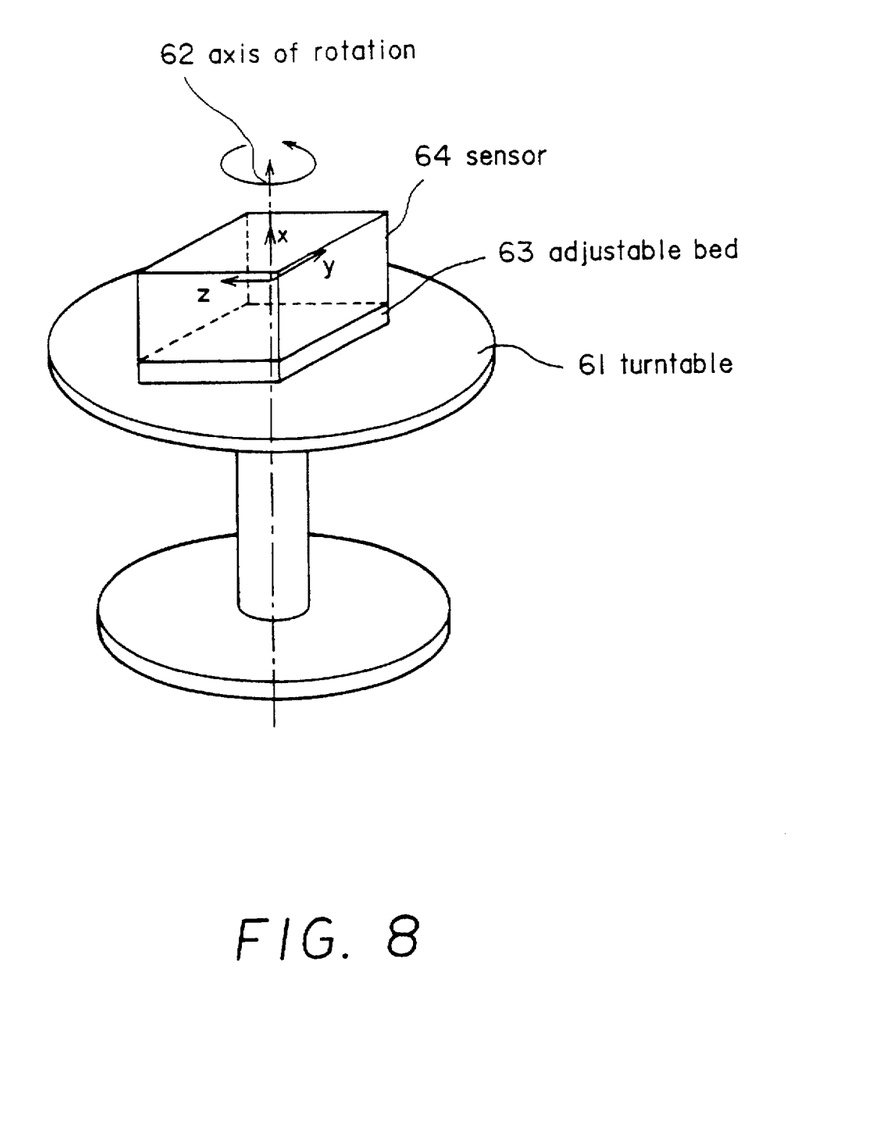
FIG. 8 illustrates an example of calibrating a sensor on a calibration table.

(a) Firstly, each of the sensors is placed on a turntable 61 rotatable around a vertical axis as shown in FIG. 8 such that the axis 62 of rotation coincides with the x-axis of the sensor, and the output voltage of the sensor is measured $n_1$ times by the voltmeter varying the angle of rotation of the turntable 61; then, after placing the sensor on the turntable such that the y-axis of the sensor coincides with the axis 62 of rotation, the output voltage is measured $n_2$ times in the same way as stated above; again, after having the z-axis of the sensor coincided with the axis 62 of rotation, the output voltage is measured $n_3$ times in the same way as stated above. During such measurement, an adjustable bed 63 is used so that the height of the sensor from the turntable remains the same all the time.

The outputs of respective sensors measured by rotating the same around the x-axis, y-axis, and z-axis as stated above are denoted, respectively, $V_x(k)$, $V_y(k)$, $V_z(k)$ where $k=1, 2, 3, \ldots, n$ $n=n_1+n_2+n_3$.

The values of the correction factors used in the foregoing formula (102) are set as follows:
$a_{11}^{(0)}=1$, $a_{22}^{(0)}=1$, $a_{33}^{(0)}=1$, $a_{12}^{(0)}=a_{13}^{(0)}=a_{21}^{(0)}=a_{23}^{(0)}=a_{31}^{(0)}=a_{32}^{(0)}=0$, $V_{x0}^{(0)}=V_{y0}^{(0)}=V_{z0}^{(0)}=0$ (b) The offset, and error in the sensitivity of axes, and error in the orthogonality between axes are compensated for by the following formula (103), $$\begin{pmatrix} V_x^{(j)}(k) \\ V_y^{(j)}(k) \\ V_z^{(j)}(k) \end{pmatrix} = \begin{pmatrix} a_{11}^{(j)} & a_{12}^{(j)} & a_{13}^{(j)} \\ a_{21}^{(j)} & a_{22}^{(j)} & a_{23}^{(j)} \\ a_{31}^{(j)} & a_{32}^{(j)} & a_{33}^{(j)} \end{pmatrix} \left( \begin{pmatrix} V_x(k) \\ V_y(k) \\ V_z(k) \end{pmatrix} - \begin{pmatrix} V_{x0}^{(j)} \\ V_{y0}^{(j)} \\ V_{z0}^{(j)} \end{pmatrix} \right) \qquad (103)$$

where $V_x^{(j)}(k)$, $V_y^{(j)}(k)$, $V_z^{(j)}(k)$, $k=1,2,3, \ldots, n$, $j=0$ (c) If the sensor functions ideally, $|V^{(j)}(k)|$ must remain constant regardless of how the sensor is placed. In fact, fluctuation in the value occurs due to the offset, error in the sensitivity of the sensor, and error in the orthogonality between the axes thereof. Hence, $|V^{(j)}(k)|$ corresponding to the absolute value of a magnetic field after correction as described in (b) above is computed to obtain variance $\sigma_v(j)^2$ thereof.

(d) On the assumption that $\Delta a_{11}$ is a positive invariable sufficiently smaller than 1, compensating computation is performed according to the foregoing formula (103) by substituting $a_{11}^{(j)} + \Delta a_{11}$ for $a_{11}^{(j)}$, and on the basis of data thus obtained, variance $\sigma_v(j)^2|_{a11=a11(j)+\Delta a11}$ of $|V^{(j)}(k)|$ corresponding to the absolute value of a magnetic field as above is obtained. Similarly, variance $\sigma_v(j)^2|_{a11=a11(j)-\Delta a11}$ is obtained by substituting $a_{11}^{(j)}$, $-\Delta a_{11}$ for $a_{11}^{(j)}$.

(e) On the basis of difference between two variance values obtained according to (d) above, namely, $\sigma_v(j)^2|_{a11=a11(j)+\Delta a11}$ and $\sigma_v(j)^2|_{a11=a11(j)-\Delta a11}$, $a_{11}^{(j+1)}$ is estimated.

(f) Following the same procedure, $a_{12}^{(j+1)}$, $a_{13}^{(j+1)}$, $a_{21}^{(j+1)}$, $a_{22}^{(j+1)}$, $a_{23}^{(j+1)}$, $a_{31}^{(j+1)}$, $a_{32}^{(j+1)}$, $a_{33}^{(j+1)}$, $V_{x0}^{(j+1)}$, $V_{y0}^{(j+1)}$, $V_{z0}^{(j+1)}$ are successively estimated.

(g) Hereafter, the procedure (b)~(f) described above where $j=j+1$ is repeated until variance $\sigma_v(j)^2$ becomes sufficiently small; final values obtained in this way are adopted as the estimated values of $a_{11}$, $a_{12}$, $a_{13}$, $a_{21}$, $a_{22}$, $a_{23}$, $a_{31}$, $a_{32}$, $a_{33}$, $V_{x0}$, $V_{y0}$ and $V_{z0}$, respectively.

Obviously, the method of the present invention can be utilized as is for detecting submarine pipelines and metals having minuscule magnetic fields.

Also it will be noted that, in the preferred embodiments stated in the foregoing, the differential triaxial orthogonal dc magnetic sensing units are disposed longitudinally as shown in FIG. 1, however, with the sensing units disposed transversely, submarine cables can be located by this system if similar procedures are followed.

As stated above, the exact distance to a submarine cable, difference in elevation between a submarine cable and a measurement level, and the direction of a submarine cable laid down can be obtained by use of the submarine locating system of the invention.

What is claimed is:

1. A submarine cable locating apparatus for detecting a submarine cable by detecting a direct current flowing through the submarine cable and a dc magnetic field created by armoring steel wires of the submarine cable, said submarine cable locating apparatus comprising:

a submersible robot located below a ship, said robot being provided with a plurality of differential triaxial orthogonal dc magnetic sensing units each comprising two triaxial orthogonal dc magnetic sensors spaced a predetermined distance apart from one another with their corresponding axes set in parallel and each comprising three dc magnetic sensing elements each of which is sensitive only to a dc magnetic field in a specific one of three different axial directions, the three axes of respective dc magnetic sensing elements crossing each other at right angles;

means on said robot for calculating analog difference signals, for each of the x axis, y axis and z axis in a coordinate system, between the outputs of different pairs of two dc magnetic sensors respectively incorporated in said triaxial orthogonal dc magnetic sensing units and having corresponding axes set in parallel;

means for converting said analog difference signals to digital difference signals;

means for transmitting said digital difference signals to the ship;

a processing unit located on the ship and utilizing said digital difference signals to compute the distance between the robot and a submarine cable, to compute the difference in elevation between said robot and the submarine cable, and to compute the direction of the submarine cable; and means on the ship for displaying the results of the computations performed by said processing unit.

2. The submarine cable locating apparatus of claim 1 wherein the calculations performed by the processing unit also utilize data representative of the results of correction for fluctuation in the sensitivity of, and offset of the dc magnetic sensing elements and the angular deviation of respective axes of said magnetic sensing elements, to determine the position of a submarine cable.

3. The submarine cable locating apparatus of claim 1 wherein said processing unit utilizes data obtained by rotating the submersible robot once at an underwater spot of uniform dc magnetic field where neither a magnetic substance nor direct current is present in order to eliminate the effect of variation in the output of the differential triaxial orthogonal dc magnetic sensing units due to rotation of the submersible robot.

4. The submarine cable locating apparatus of claim 1 wherein said differential triaxial orthogonal dc magnetic sensing units are fixed to and enclosed in a container securely attached to a pressure-resistant vessel through a soft buffer member in order to prevent distortion of the axes of the dc magnetic sensing elements caused by expansion or contraction of said vessel due to seawater pressure and changes in the temperature of seawater.

5. The submarine cable locating apparatus of claim 1 wherein said differential triaxial orthogonal dc magnetic sensing units are enclosed in a container made of high strength insulating material.

* * * * *